(12) United States Patent
Waeller

(10) Patent No.: US 9,499,173 B2
(45) Date of Patent: Nov. 22, 2016

(54) VEHICLE COMFORT SYSTEM FOR USING AND/OR CONTROLLING VEHICLE FUNCTIONS WITH THE ASSISTANCE OF A MOBILE DEVICE

(71) Applicant: Volkswagen Aktiengesellschaft, Wolfsburg (DE)

(72) Inventor: Christoph Waeller, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/199,392

(22) Filed: Mar. 6, 2014

(65) Prior Publication Data

US 2014/0200765 A1    Jul. 17, 2014

Related U.S. Application Data

(63) Continuation of application No. PCT/EP2012/003705, filed on Sep. 5, 2012.

(30) Foreign Application Priority Data

Sep. 6, 2011    (DE) .................. 10 2011 112 599

(51) Int. Cl.

| G06F 17/00 | (2006.01) |
|---|---|
| B60W 50/00 | (2006.01) |
| H04L 12/28 | (2006.01) |
| H04W 4/04 | (2009.01) |
| H04B 1/3822 | (2015.01) |

(Continued)

(52) U.S. Cl.
CPC ........ *B60W 50/0098* (2013.01); *H04L 12/282* (2013.01); *H04W 4/046* (2013.01); *H04B 1/202* (2013.01); *H04B 1/3822* (2013.01); *H04L 2012/40273* (2013.01); *H04W 4/008* (2013.01); *H04W 48/04* (2013.01)

(58) Field of Classification Search
None
See application file for complete search history.

(56) References Cited

U.S. PATENT DOCUMENTS 4,477,874 A * 10/1984 Ikuta .................... B60N 2/0248
                                                         307/10.7
5,917,405 A *  6/1999 Joao ......................... 340/426.17
(Continued)

FOREIGN PATENT DOCUMENTS

| CA | 2600896 A1 * | 9/2006 |
|---|---|---|
| DE | 199 43 484 A1 | 3/2001 |

(Continued)

*Primary Examiner* — Truc M Do
*Assistant Examiner* — Jess Whittington
(74) *Attorney, Agent, or Firm* — Barnes & Thornburg LLP

(57) ABSTRACT

Vehicle with a comfort system having: a vehicle controller device, via which different vehicle systems and/or vehicle functions can be controlled; at least one vehicle communication device for exchanging data via wireless communication; a plurality of identification modules arranged in the vehicle that comprise an identification code readable in the vicinity of the identification modules, each identification code being assigned to an installation location of the identification module. The vehicle controller device is designed to set up a communication connection to a mobile device via the vehicle communication device to receive, via the communication connection, an identification code read out by the mobile device and, via the mobile device and the mobile communication connection, to allow or prohibit control or usage of individual or all vehicle functions and/or systems selectively on the basis of the received identification code.

21 Claims, 3 Drawing Sheets

(51) Int. Cl.
　　　*H04W 4/00*　　　(2009.01)
　　　*H04W 48/04*　　(2009.01)
　　　*H04L 12/40*　　　(2006.01)
　　　*H04B 1/20*　　　(2006.01)

(56) References Cited

U.S. PATENT DOCUMENTS

| | | | |
|---|---|---|---|
| 6,505,780 | B1 | 1/2003 | Yassin et al. |
| 6,584,389 | B1 | 6/2003 | Reimann et al. |
| 9,083,581 | B1* | 7/2015 | Addepalli ............ H04W 4/046 |
| 2003/0193390 | A1* | 10/2003 | Muramatsu ............... 340/426.13 |
| 2005/0094610 | A1* | 5/2005 | de Clerq ................ G05B 15/02 370/338 |
| 2005/0197174 | A1* | 9/2005 | Hasan et al. ................ 455/575.9 |
| 2006/0265123 | A1* | 11/2006 | Chon .................... G01C 21/30 701/533 |
| 2007/0180025 | A1* | 8/2007 | Kobayakawa et al. ....... 709/204 |
| 2007/0200684 | A1* | 8/2007 | Colby ........................ 340/10.51 |
| 2008/0103651 | A1* | 5/2008 | Pillar et al. ....................... 701/29 |
| 2008/0192659 | A1* | 8/2008 | Santavicca ................... 370/280 |
| 2008/0287074 | A1* | 11/2008 | Grunhold ..................... 455/90.2 |
| 2009/0075676 | A1 | 3/2009 | Park et al. |
| 2009/0207184 | A1* | 8/2009 | Laine .................... G06F 1/1626 345/619 |
| 2009/0284359 | A1* | 11/2009 | Huang et al. .............. 340/426.1 |
| 2010/0048244 | A1 | 2/2010 | Goren |
| 2010/0170926 | A1* | 7/2010 | Richter ......................... 224/447 |
| 2011/0021234 | A1 | 1/2011 | Tibbitts et al. |
| 2011/0137490 | A1* | 6/2011 | Bosch et al. ...................... 701/2 |
| 2011/0208834 | A1 | 8/2011 | Nagano et al. |
| 2011/0220697 | A1* | 9/2011 | Luk .................... B60R 11/0258 224/567 |
| 2011/0304444 | A1* | 12/2011 | Zhang et al. ............. 340/425.5 |
| 2012/0282906 | A1* | 11/2012 | Frye ........................ H04W 4/04 455/414.2 |
| 2012/0303177 | A1* | 11/2012 | Jauch et al. ....................... 701/1 |
| 2013/0238167 | A1* | 9/2013 | Stanfield .................. G08G 1/20 701/2 |
| 2013/0259232 | A1* | 10/2013 | Petel .................... H04L 63/0492 380/270 |
| 2013/0295900 | A1* | 11/2013 | Hood ...................... H04W 4/04 455/418 |

FOREIGN PATENT DOCUMENTS

| | | |
|---|---|---|
| DE | 101 08 578 A1 | 2/2002 |
| DE | 10 2005 024 817 A1 | 12/2006 |
| DE | 10 2009 025 433 A1 | 1/2010 |
| GB | 2461715 A | 1/2010 |
| WO | WO 03/007588 A2 | 1/2003 |
| WO | WO 2011067397 A1 * | 6/2011 |

* cited by examiner

VEHICLE COMFORT SYSTEM FOR USING AND/OR CONTROLLING VEHICLE FUNCTIONS WITH THE ASSISTANCE OF A MOBILE DEVICE

This nonprovisional application is a continuation of International Application No. PCT/EP2012/003705, which was filed on Sep. 5, 2012, and which claims priority to German Patent Application No. 10 2011 112 599.3, which was filed in Germany on Sep. 6, 2011, and which are both herein incorporated by reference.

BACKGROUND OF THE INVENTION

Field of the Invention

The invention relates to a vehicle with a comfort system in which vehicle functions or vehicle systems can be used and/or controlled with the assistance of a mobile device. Further, the invention relates to such a comfort system comprising a vehicle and a computer program product, which provides the necessary functionality for using and/or controlling the vehicle functions and/or systems on the mobile device and a computer program product itself, which provides these functionalities in an execution of the associated program code on the mobile device.

Description of the Background Art

Modern vehicles, particularly motor vehicles, and here very especially passenger vehicles, comprise a plurality of vehicle systems and provide a plurality of vehicle functions which bring about an increase in user comfort. Systems and functions from the entertainment field, for example, a car radio, various types of media players, but also navigation systems and other assistance systems, for example, parking assistance systems, lane keeping assist systems, climate control systems, adjustable seat devices, and the like are mentioned here as examples. Operating devices and in part additional output devices are necessary to use a number of these functionalities, which provide vehicle systems and/or vehicle functions. To output navigation data that help a driver to find a travel route in order to reach a predetermined destination, it is typical, for example, to output acoustic, verbal information and instructions and generally to output in addition or alternatively on a display area of a display device directional information in advance, for example, overlaid in a map of the vehicle's current surroundings. In entertainment systems, for example, title selection lists with which a user by operating a control device can select a title which is then played over an audio system built into the vehicle are shown on a display area of a display device.

It is known from the conventional art, in one respect, to provide output and operating devices in the operating area and within easy reach for the driver, so that he can operate the system. Multifunction operating devices, which provide the functionalities of a navigation system and an entertainment system, are arranged in part in a center console between a driver's seat and a passenger seat, so that operation by the passenger is possible as well. It is also known, moreover, to install a plurality of display devices and/or display and operating devices in front of the individual seats, in order to enable individual use of entertainment functionalities for the individual passenger in a motor vehicle. A technical effort with respect to cabling and the hardware components used is considerable, however, so that this is customary thus far only in higher-priced vehicles.

Proposed in DE 10 2009 025 433 A1 for connecting a number of similar and/or different devices with communication means for external data exchange to an integrated operating, display, and control device with display means for displaying image data, loudspeaker means for playing back acoustic data, control means and communication means for external data exchange in a motor vehicle, is a functional module, which comprises first communication means for external data exchange with the integrated operating, display, communication, and control device, a number of further communication means for external data exchange with the devices, and a translation device and is configured to process data received from the devices and the operating, display, and control device in regard to a possible interaction, specified in the translation device, of the devices with the integrated operating, display, and control device and to send the result of the processing to the devices and/or the integrated operating, display, and control device. This is intended to make it possible for the vehicle user to easily use different devices in an integrated operating, display, and control device available in the motor vehicle. In this regard, the vehicle user is not committed to a special device or a special device class, but after purchasing the motor vehicle can connect new additional devices via upgraded functional modules with a suitable range of functions.

U.S. Pat. No. 2010/0048244 A1 discloses a system for the remote control of vehicle systems. The remote control system comprises a connector device, which is connected to a central computer of the vehicle through a vehicle data bus, for example, a CAN bus. The system comprises further remote control devices, which communicate with the connector device through which various accessories installed in the vehicle are controlled.

GB 2461715 A discloses an in-car docking system for electronic devices, for example, a remote control, a navigation device, a cellular telephone, an MP3 player, or the like. This comprises a tray-like housing with a support element or a carrier arm, pivotally mounted with respect to the housing. An attachment mechanism, which enables a releasable securing of the electronic device, is provided on the support element. The support element can be moved between a first position, in which the electronic device, which is mounted on the support element, is contained in the housing, and a second position, in which the electronic device extends from the housing and may be released from the support element. The support element is resiliently biased toward the second position and latch means can retain the support element in the first position. Further, electronic contacts are provided for engaging in the corresponding contacts of the electronic device, when it is placed on the support element. The housing may be configured, for example, as part of an armrest or a center console and may have a hinged lid.

The known systems each require a high technical pre-equipping effort, in order to be able to use electronic devices such as, for example, mobile telephones or personal digital assistants in a vehicle for controlling and using vehicle functions.

SUMMARY OF THE INVENTION

It is therefore an object of the invention to provide an improved vehicle, a comfort system, and a computer program product, which puts a mobile device in the position of realizing a vehicle comfort system with a suitable vehicle.

In an exemplary embodiment, the invention is based on the idea of arranging identification modules at different installation locations in the vehicle; each of the modules comprises an identification code, assigned to the particular installation location. The identification modules are designed so that the identification code can be read out by a mobile device, which comprises an identification module reader, provided the mobile device is brought close to the identification module. The identification modules and the identification module reader are designed so that reading out of the identification code is possible only in the vicinity of the installation location of the particular identification module. The mobile device via a mobile device communication unit sets up a wireless communication connection with a communication device of the vehicle and depending on the acquired identification code provides different functionalities in the data exchange via the communication connection for a user. In this regard, a selection of the functionalities offered to the user with respect to control and possible use of vehicle functions is provided depending on the identification code and thereby depending on the installation location. If the identification module is built into, for example, the rear passenger compartment of the motor vehicle, then, for example, functionalities for the use and control of the audio system of the vehicle and/or of ventilation and climate control devices are provided in the back of the vehicle. But, for example, functionalities are not provided that relate to parameters of safety-related vehicle systems, for example, lane keeping assist systems or optical and acoustic parking assistance systems. If the identification module is mounted, for example, in front of the vehicle driver's seat, for example, then functionalities are provided that relate to parameters of safety-relevant vehicle systems, for example, lane keeping assist systems or optical and acoustic parking assistance systems. In addition, the operation of buttons on the mobile device or a touchscreen of the mobile device can be prevented and operation of the mobile device allowed only via other operating elements present in the vehicle (e.g., operating elements on the steering wheel), when the mobile device is difficult to reach by the driver, for example, because of the steering wheel or this is not possible for reasons of safety. This is the case, for example, when the installation location is arranged in front of a combination instrument or between the combination instrument and the base of the front windshield. The advantage of the invention is that a mobile device can be used alternatively at different locations of the vehicle and in each case the functionalities that are allowed and/or provided for the particular use location are provided. Because the communication with the vehicle via a vehicle communication device occurs wirelessly, cabling can be omitted in the vehicle. The identification modules and a vicinity readout device, which is called here an identification module reader, are a requirement for assuring the installation location-dependent provision and/or restriction of functions.

In particular, a vehicle with a comfort system is proposed, comprising: a vehicle control device, by means of which different vehicle systems and/or vehicle functions can be controlled and/or used; at least one vehicle communication device for exchanging data via a wireless communication line; a plurality of identification modules, which are arranged in the vehicle and comprise an identification code readable in the vicinity of the identification module, said code being assigned to a particular installation location of the identification module, preferably in a one-to-one manner, whereby the vehicle control device is designed to set up a communication connection to a mobile device via the vehicle communication device, to receive, via the communication connection, an identification code, read out by the mobile device of an identification module arranged in the vehicle, and, via the mobile device and the communication connection, to allow or prohibit control and/or use of individual or all vehicle functions and/or systems selectively depending on the received identification code.

Further, a comfort system for a vehicle is proposed, comprising: a vehicle with: a vehicle control device, by means of which different vehicle systems and/or vehicle functions can be controlled and/or used; at least one vehicle communication device for the wireless exchange of data with a mobile device; a plurality of identification modules, which are arranged in the vehicle and comprise an identification code readable in the vicinity of the identification module, said code being assigned to a particular installation location of the identification module, preferably in a one-to-one manner; and a computer program product, which comprises program code, executable in a program-controlled processing unit (CPU) of a mobile device, which: comprises an identification module reader for reading out the identification codes from identification modules in the vicinity of a particular identification module, at least one input device for acquiring user input, at least one output device, and a mobile device communication unit, each of which can be controlled via the program-controlled processing unit, whereby the program code is designed to control the identification module reader in order to acquire with it the identification code of one of the identification modules in an acquisition range of the identification module reader, in the event that an identification code is acquired, to set up a wireless communication connection for exchanging data with the vehicle control device via the mobile device communication unit and the vehicle communication device, and depending on the acquired identification code and/or the data exchanged via the communication connection to provide different functionalities of the vehicle system and/or vehicle functions for a user by means of the at least one output device and/or the at least one input device.

Further, a computer program product for a vehicle-related comfort system is proposed, whereby the computer program product comprises program code, executable in a program-controlled processing unit (CPU) of a mobile device, which comprises an identification module reader for reading out identification codes from identification modules in the vicinity of the identification module, at least one input device for acquiring user input, at least one output device, and a mobile device communication unit, whereby the different units of the mobile device can each be controlled via the program-controlled processing unit, whereby the program code is designed to control the identification module reader in order to acquire with it the identification code of one of the identification modules in an acquisition range of the identification module reader, in the event that the identification code is acquired, to set up a wireless communication connection for exchanging data with a vehicle control device via the mobile device communication unit and a vehicle communication device, and depending on the acquired identification code and/or the data exchanged to provide different functionalities of the vehicle systems and/or vehicle functions for a user by means of the at least one output device and/or the at least one input device. The computer program product can be stored on a data medium, for example, an SD card storage device, a USB stick, a CD, DVD, or any other pixel storage medium. Likewise, the program code of the computer program product can be stored in a memory of the vehicle and retrieved by the mobile device via a wireless communication connection from the vehicle. In further embodiments, it can be provided that a computer program product version adapted to the particular model of the mobile device can be retrieved via a computer network, for example, the Internet, from a server, for example, a server of the vehicle manufacturer. An appropriately pre-equipped vehicle and a suitable mobile device provided with the computer program product can thus together provide a vehicle comfort system, in which a mobile device provides different functionalities for a user at different locations in the vehicle.

In an embodiment, it is provided that the vehicle control device comprises an authorization control device, which depending on the transmitted identification code controls an authorization for actuating or operating the vehicle functions and/or vehicle systems and authorization for a back-transmission of data of the vehicle systems and/or vehicle functions to the mobile device. It can be assured in this way that only a mobile device that is located in the vicinity of an identification module of the vehicle can also access the functionalities of the vehicle. Access to vehicle functions and vehicle systems by mobile devices of third parties is effectively prevented as a result.

In a further embodiment of the invention, it is provided that the vehicle control device can be is designed to set up the communication connection only when during the setting up of the communication connection an identification code is transmitted that is assigned to one of the identification models installed in the vehicle. This also ensures that the vehicle functions and vehicle systems can only be used by a mobile device located in the vehicle in the vicinity of an identification module.

In order to assure moreover that the use occurs only with a computer program product that is authorized, for example, by the vehicle manufacturer, it is provided in an embodiment of the invention that the vehicle control device can be designed to allow the setting up of the communication connection and/or use and/or control of the vehicle functions or vehicle systems only when an application code is transmitted from the mobile device to the vehicle control device, which identifies the computer program product. Preferably, the application code is evaluated in addition to the acquired identification code.

Passive RFID chips can be used to form the identification modules. These are characterized in that they can be read by means of electromagnetic waves. The RFID chip need not have its own power supply to read out the memory of the RFID chip. The energy for this is then taken during reading out of the RFID chip from the electromagnetic waves sent out by the reader. In a suitable embodiment, it can be achieved that a standardized reader can be read out only in the immediate vicinity at a distance of a maximum of 50 cm, preferably of less than 50 cm, preferably up to about 10 cm, from the RFID tag. This can be assured by the design of the RFID module and particularly of the materials employed therein. Chips that carry out a communication according to the Near Field Communication (NFC) standard are also regarded as RFID chips. All devices that are electronically readable wirelessly by means of electromagnetic waves are regarded as RFID chips.

The program code can be designed to control the identification module reader so that it reads out continuously or at intervals the identification code of the present or assumed identification module in the acquisition range, and the provision of the functionalities of the vehicle systems and vehicle functions is ended as soon as the reading out fails or a change in the identification code is detected.

It is assured in this way that the functionality is provided only as long as the mobile device is in the immediate vicinity of the particular identification module.

Alternatively or in addition, the control device of the vehicle can request and/or check a transmission of the identification codes at regular intervals.

In order to prevent that an identification code that has been read in once can be used repeatedly, the identification modules can be designed so that they code and transmit back query information transmitted during a reading out or a query code with the identification code or a second code assigned to the identification code. In this way, the vehicle control device is given the opportunity, on the basis of the back-transmitted coded request code and optionally in addition the identification code, to check whether the transmitted query value or query code was coded correctly by the identification module by means of the identification code or the additional code. The coding can occur, for example, according to a so-called asymmetric encryption method, in which for each additional code, which is stored in one of the identification modules, an associated code is stored in the vehicle control device; based on the associated code, the query code, coded by the identification module of the vehicle control device, can be checked with respect to the correct coding/encryption in the vehicle control device. If the identification code is not transmitted correctly or if the coding of the query code is wrong, the communication connection is closed.

A holder for receiving the mobile device can be arranged or formed at the installation locations of the identification modules. In an embodiment, the holder can comprise one or more elastic elements, in or between which the mobile device can be clamped. For example, the elastic element(s) can be made from a foam rubber material and be adapted to the special shape of a mobile device. In this case, the remaining free space is selected so that it is somewhat smaller than the dimensions of the device, so that the device in the mounted state is locked in a clamping manner by the elastic element(s). Other holders can comprise one or more spring-loaded hooks or snap elements, which can be engaged around the edges and/or corners of the mobile device, in order to mount said device. Preferably, the holders are formed such that they can be closed with a cover, which sits flush with a surrounding surface of the particular vehicle component on which the holder is mounted or formed.

The vehicle communication device and the mobile device communication unit can be designed to set up a wireless communication connection according to a standardized transmission method. In this case, transmission methods may be used which function without interconnecting an off-board switching and/or communication device. In particular, so-called WLAN protocols (Wireless Local Area Network protocols) or communication according to the so-called Bluetooth standard are possible. Basically, however, other wireless communication methods may also be used.

It is provided in an embodiment that at least two identification modules and possibly the assigned holders can be arranged in the vehicle at two different locations of the following installation locations: in the dashboard to the side in front of the driver's seat, in front of a combination instrument, between the combination instrument and a base of the front windshield on the dashboard, in the center console between the driver's seat and a passenger seat, in or on the dashboard in front of the passenger seat, in a backrest of the driver's seat, in a backrest of the passenger seat, in a headrest of the vehicle, in a rear door, on the headliner of the vehicle, or in front of or below a rearview mirror. Of course, other installation locations may be considered.

In an embodiment of the vehicle or of the comfort system, at least one holder can be designed such that the mobile device which is placed in the holder and which comprises a digital camera with a detection aperture on an opposite side from a display area of a display device, which is provided as an output device, can acquire the environment of the vehicle by means of the digital camera and that the program code is designed to bring about the acquisition of the environment by means of the digital camera and to display on the display area an augmented reality of the environment of the vehicle with the aid of data, transmitted via the communication connection, of the vehicle control device. This can be utilized, for example, for such functionalities that support parking and overlay data determined by distance sensors and/or navigation data on the acquired environment. Likewise, lane information or also acquired road sign information or the like can be overlaid on the displayed environment as artificial symbols.

The program code in an embodiment comprises modules, whose assigned program code sections when executed in the program-controlled processing unit by means of the at least one output device and/or the at least one input device provides a user interface for control and/or use of the assigned vehicle systems or vehicle functions, whereby the program code is designed to provide the functionality of at least individual modules only if release information received by the vehicle is present and/or the acquired identification code permits this. The identification codes can be designed so that they comprise authorization information, preferably coded, for individual modules.

In an embodiment, the program code can be designed to control a digital camera of the mobile device during the acquisition of at least one identification code, in order to acquire the vehicle environment and to display on the output device of the mobile device an augmented reality of the vehicle environment with the aid of data, transmitted via the communication connection, of the vehicle control device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
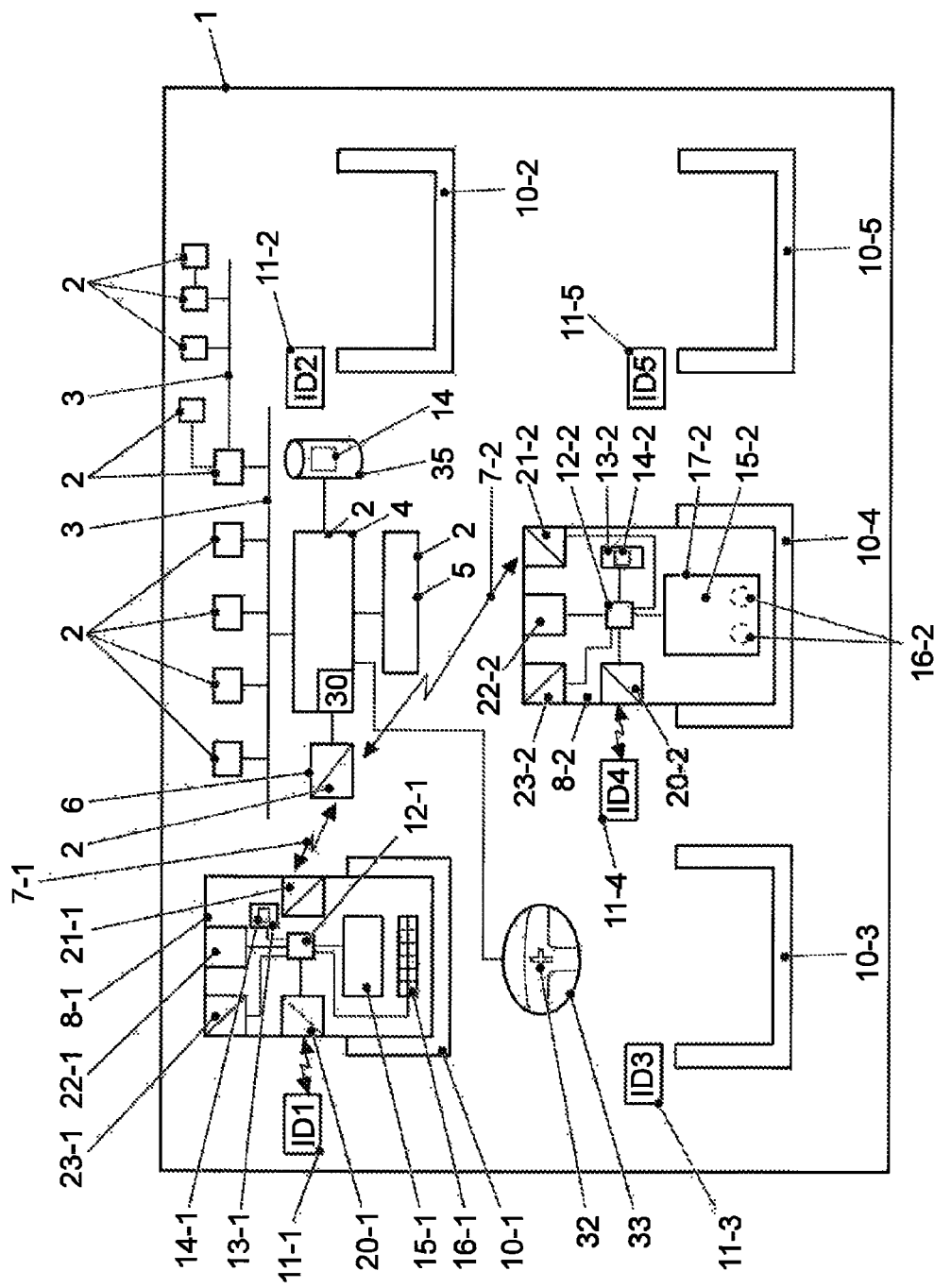
FIG. 1 shows a schematic diagram of a vehicle with a comfort system.

A vehicle 1 is shown schematically in FIG. 1. It comprises a plurality of vehicle systems 2, which provide a plurality of functions. Vehicle systems can be all components of the vehicle, for example, control devices, actuators, or sensors, to name a few. Vehicle systems 2 are connected directly or indirectly in terms of information technology via one or more vehicle data buses 3 and/or other vehicle systems to a vehicle control device 4. Vehicle control device 4 can also be regarded as a vehicle system 2. One of the vehicle systems 2 is designed as a display and operating device 5, over which inputs and outputs of vehicle systems 2 can occur. Embodiments without such a display and operating device 5 are also conceivable, however. Vehicle control device 4 is coupled to a vehicle communication device 6 in terms of information technology. Vehicle communication device 6 is designed to set up wireless communication connections 7-1, 7-2, for example, to mobile devices 8-1, 8-2. These communication connections 7-1, 7-2 can be designed, for example, as WLAN connections or Bluetooth connections.

In order to be able to provide comfort functionalities at different locations in vehicle 1 without an increased hardware cost, particularly cabling cost, vehicle 1 comprises a plurality of holders 10-1 to 10-5 installed at different installation places. These are designed so that they can receive a mobile device 8-1, 8-2. Holders 10-1 to 10-5 can be designed so that they are designed and adapted to one or different models of mobile devices 8-1, 8-2 or are designed so that they can receive and retain a plurality of different and differently designed mobile devices 8-1, 8-2. Exemplary holders are explained below with reference to FIGS. 4 and 5. The person skilled in the art is familiar with a number of holders for mobile devices, however, which can be used in a known or slightly modified manner at the different installation locations in the interior of vehicle 1. Holders 10-1 to 10-5 are used only for the mechanical retention of mobile devices 8-1, 8-2.

Each installation location or each holder 10-1 to 10-5 is assigned an identification module 11-1 to 11-5. An identification code ID-1 to ID-5 assigned one-to-one to the particular installation location or to the particular holder 10-1 to 10-5 is stored in each identification module 11-1 to 11-5. Identification modules 11-1 to 11-5 are preferably designed as RFID modules which can be read out touch-less electronically. Preferably, the identification modules are designed as passive RFID modules, which take the necessary energy for reading out and determining the identification code from an electromagnetic field of a readout device.

Mobile devices 8-1, 8-2 are used to be able to provide different functionalities at the different installation locations of holders 10-1 to 10-5 or identification modules 11-1 to 11-5. It is essential that one and the same mobile device, for example, 8-1 can be arranged at the different installation locations of holders 10-1 to 10-5 or installation locations or identification modules 11-1 to 11-5, to provide a user with the comfort functionalities of the vehicle or vehicle systems 2. In this regard, different functionalities and/or the same functionalities are provided in a different way depending on the installation location.

In order to be able to provide this functionality, mobile devices 8-1, 8-2 each comprise a central processing unit 12-1, 12-2, which is designed, for example, as a CPU and is operated under program control. To this end, central processing unit 12-1, 12-2 is connected to a memory unit 13-1, 13-2. Program code 14-1, 14-2 of a computer program product, executable in central processing unit 12-1, 12-2, is stored in memory unit 13-1, 13-2. An output device 15-1, 15-2 and an input device 16-1, 16-2 are coupled to central processing unit 12-1, 12-2. Output device 15-1 is designed, for example, as a display area and input device 16-1 as a keypad. In the embodiment of mobile device 8-2, output device 15-2 and input device 16-2 are combined to form a touchscreen device 17-2. Output devices 15-1, 15-2 can comprise, apart from the display device, also a loudspeaker, a headphone output, or the like. Likewise, the input device can comprise additional operating elements.

Mobile devices 8-1, 8-2 comprise further an identification module reader 20-1, 20-2. Further, mobile devices 8-1, 8-2 comprise a communication device 21-1, 21-2 for setting up a wireless communication connection 7-1, 7-2 with vehicle communication device 6. Mobile device communication unit 21-1, 21-2 and vehicle communication device 6 are designed such that wireless communication can occur without interconnection of other transmission or relay stations within the vehicle interior. Communication connections 7-1, 7-2 therefore are local communication connections for data exchange between vehicle 1 and the particular mobile devices 8-1, 8-2.

Mobile devices 8-1, 8-2 can comprise other devices, for example, a digital camera 22-1, 22-2 or a cellular telephone module 23-1, 23-2 for setting up cellular telephone connections. In this regard, cellular telephone connections or data connections can be set up according to different standards, for example, GSM, GPRS, UMTS, etc.

Central processing unit 12-1, 12-2 of the particular mobile device 8-1, 8-2 is controlled via program code 14-1, 14-2 such that identification codes ID-1, ID-2 of identification modules 11-1, 11-2, located in the acquisition range of mobile devices 8-1, 8-2, are read out first via identification module readers 20-1, 20-2. If such an identification code is acquired, then communication connections 7-1, 7-2 are set up via mobile device communication unit 21-1, 21-2 by the cellular telephone devices 8-1, 8-2 and via vehicle communication device 6 with vehicle control device 4. Data are exchanged with vehicle control device 4 via communication connections 7-1, 7-2, so that functionalities of vehicle systems 2 of vehicle 1 are provided on mobile devices 8-1, 8-2 via a user interface, preferably a graphical user interface (GUI). In addition or alternatively to the display and operating device 5, therefore, functionalities of vehicle systems 2 can be used via mobile devices 8-1, 8-2 and optionally controlled by the vehicle control device by means of user inputs acquired via input devices 16-1, 16-2 and data transmission via wireless communication connections 7-1, 7-2 to vehicle control device 4. In this regard, different functionalities are provided on different mobile devices 8-1, 8-2 depending on identification codes ID-1, ID-2, assigned to installation locations or identification modules 11-1, 11-4.

If mobile device 8-1 or holder 10-1 and identification module 11-1 are arranged in the area of the dashboard in front of the driver, vehicle-related information, for example, vehicle speed, engine speed, oil temperature, or the like are displayed here, for example, on output device 15-1 or its display area. Further, certain infotainment data are shown only scaled down or not at all. For example, a movie played on a video player on this mobile device 8-1 is not displayed when the vehicle is in motion. In addition, keys and/or the operating of a touchscreen of mobile device 8-1 is deactivated, when the vehicle is moving and mobile device 8-1 is placed in holder 10-1. The deactivated functions can be reactivated as soon as the vehicle is stationary. The authorization for the control of vehicle functions or the transmission of data to mobile devices 8-1, 8-2 in an embodiment is regulated, for example, via an authorization device 30 of vehicle control device 4. If the installation location of holder 10-4 or of identification module 11-4 is arranged, for example, in the backrest of the driver's seat, then multimedia information in particular is output on the display area, designed as touchscreen 17-1, 17-2, of output device 15-2.

Information is perhaps output differently for the same vehicle system, depending on the installation location where the corresponding mobile device 8-1, 8-2 is placed, i.e., in which holder and in which identification module 11-1 to 11-5. Operating devices of vehicle 1, for example, a four-way rocker switch 32 in a steering wheel 33 can also be used to control the user interface on mobile device 8-1.

Holder 10-1 in front of steering wheel 33 can be designed, for example, such that digital camera 22-1 can acquire the environment of the vehicle and can be supplemented on the display area of output device 15-1 with calculated information, for example, distances to objects, information on the direction of travel, braking distance, or the like, into a so-called augmented reality.

In order to assure that the user interface is provided only when and as long as the particular mobile device 8-1, 8-2 is placed in one of the holders 10-1 to 10-5 or in the immediate vicinity of one of the identification modules 11-1 to 11-5, the identification code is read out continuously. Other mechanisms can also be used, however. For example, a query code, modified in each case, can be transmitted at intervals from vehicle control device 4 via communication connection 7-1, 7-2 to the corresponding mobile device 8-1, 8-2, and is then transmitted via the corresponding identification module reader 20-2, 20-2 during the reading out of the identification code to the corresponding identification module 11-1, 11-2. Said identification module 11-1, 11-2 is designed such that the identification module codes individually the query code and the coded query code is sent back during the reading out of the identification code to identification module reader 20-1, 20-2. It is then sent back to vehicle control device 4 or to authorization device 30, which then checks whether the query code is coded in the expected manner. To this end, for example, asymmetric encryption methods can be used, whereby one key of a key pair is stored in the vehicle and one key in the corresponding identification module. If it is determined that no identification code can be read out or a query code is not encoded correctly, the corresponding mobile device 8-1, 8-2 or vehicle control device 4 closes the associated communication connection 7-1, 7-2. It can be assured in this way that the mobile device cannot be moved to another position and moreover can access data of the vehicle and vehicle systems. An identification code encrypted in a similar manner can also be used for security reasons.

Figure 2:
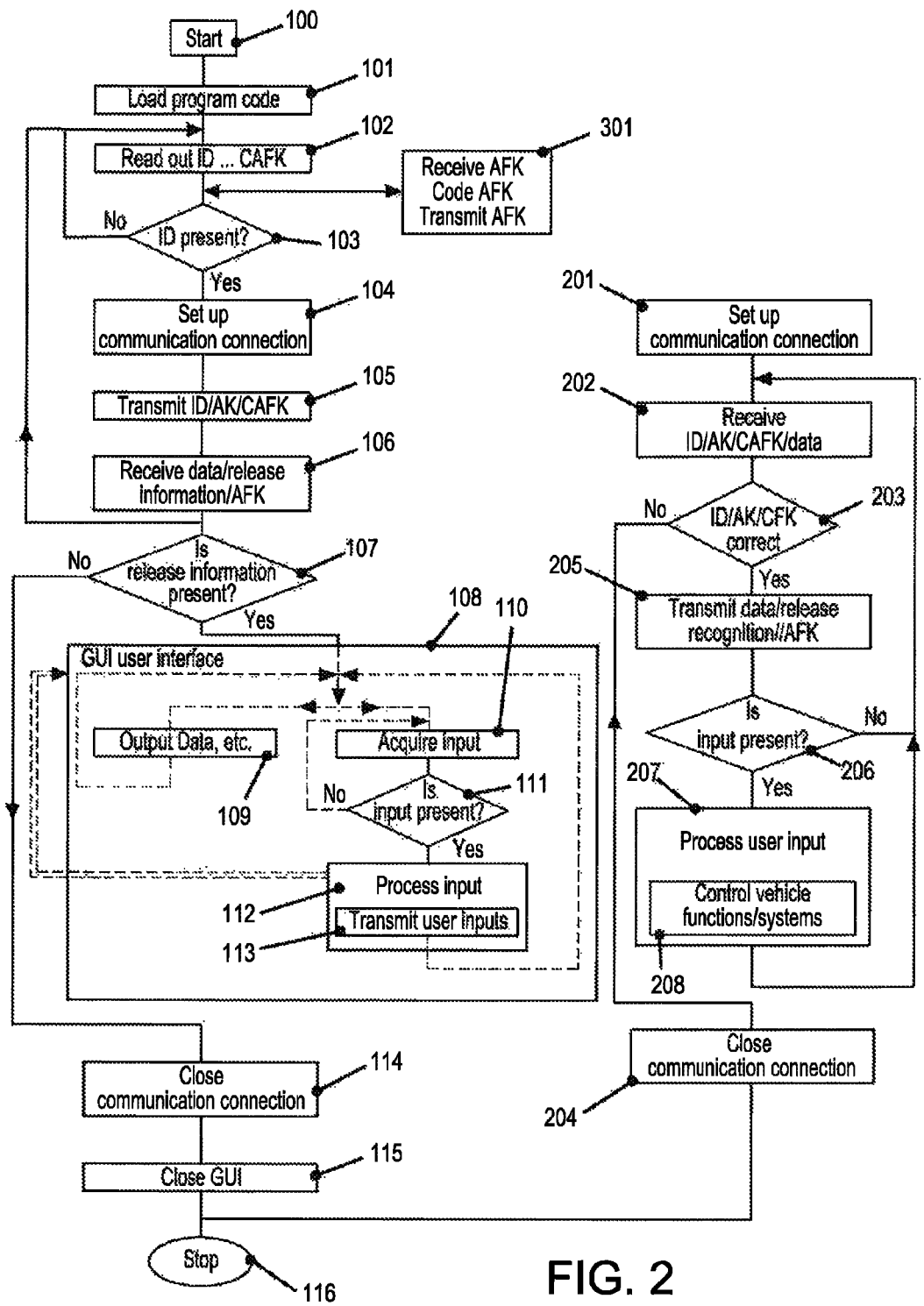
FIG. 2 shows a schematic flowchart to explain the invention.

The functionality provided by execution of a computer program product of the invention on a mobile device will be explained with FIG. 2. The computer program product or its program code 14 (cf. FIG. 1) can be stored originally in a memory device 35 of vehicle 1 and be transmitted via a wireless communication connection 7-1, 7-2 to mobile devices 8-1, 8-2.

The program code is loaded first 101 after a startup 100. This causes the identification module reader to attempt to read out an identification module designed as an RFID module 102. It is checked in a query 103 whether an identification code (ID) has been acquired. If this is not the case, then the reading out of the identification code 102 is continued. In another case, a wireless communication connection to a vehicle control device of the vehicle is set up 104, 201. At this time or subsequently the identification code ID is transmitted to the vehicle control device 105 and received by it 202. The vehicle control device or an authorization device checks whether the identification code belongs to one of the identification modules in the vehicle 203; if this is not the case, then the communication connection set up in step 201 is closed 204. If the identification code is correct, which is checked in the query 203, data and optionally release information are transmitted to the mobile device 205. It can also be provided that in addition to the identification code, which is read out from the identification module, an application code (AK) is determined which identifies and authorizes the program code of the computer program product. This is also received by the vehicle control device 202 and checked for correctness in the query 203. If this is incorrect, this also results in the closing of the communication connection on the part of the vehicle control device 204. If the identification code and optionally the application code are correct, release information is transmitted to the mobile device 205. The mobile device receives the release information or data in process step 106. It is checked in process step 107 whether release information is present. If it is present, then a user interface is provided, for example, in the form of a graphical user interface (GUI) 108. In this case, as a rule data are output 109 and inputs are acquired 110. It is checked in a step 111 whether an input is present and the acquisition of the input 110 is continued provided no input has been acquired; otherwise the input is processed 112, which can influence the provision of the graphical user interface 108. Likewise, the user input can be provided for controlling vehicle systems or vehicle functions, in which case the user inputs can be transmitted to the vehicle control device 113. After the data are received 202 by the vehicle control device, the vehicle therefore checks whether user inputs are present 206 and these are processed accordingly 207, which can lead to control of vehicle functions and vehicle systems 208. In this regard, the authorization for the corresponding user inputs or control requests is checked again and if it is not present, control is denied (not shown).

The provision of the different functionalities in the graphical user interface occurs, on the one hand, in that the program code contains different modules, and these are executed when appropriate release information of the corresponding module is present. Further, the authorization device in the vehicle controls which data are transmitted and which user inputs for controlling vehicle systems are accepted. In order to assure that the user interfaces are only provided 108 as long as the mobile device is in a holder or in the immediate vicinity of an identification module, in the shown embodiment the vehicle control device in step 205 transmits a query code which is reset with each transmission. It is transmitted from the mobile device to the identification module during the reading out of the identification code 102. The identification module receives this query code, codes the query code in a coded query code (CAFK), and transmits the coded query code back to the identification module reader during the reading out of the identification code together with or alternatively to the identification code. These are process steps 301, which the RFID module, i.e., the identification module, executes. The coded query code is then transmitted in process step 105, which is carried out continuously and/or iteratively during the provision of the functionality, to the vehicle control device, which receives it in process step 202 and checks for the correct coding in process step 203. If this is wrong, the communication connection is closed 204. Otherwise, a new query code and release information are transmitted. If the mobile device determines that an identification code is no longer acquired or release information is no longer present, the mobile device closes the communication connection 114 and then the user interface 115. The provision of the functionality is ended herewith 116.

Figure 3:
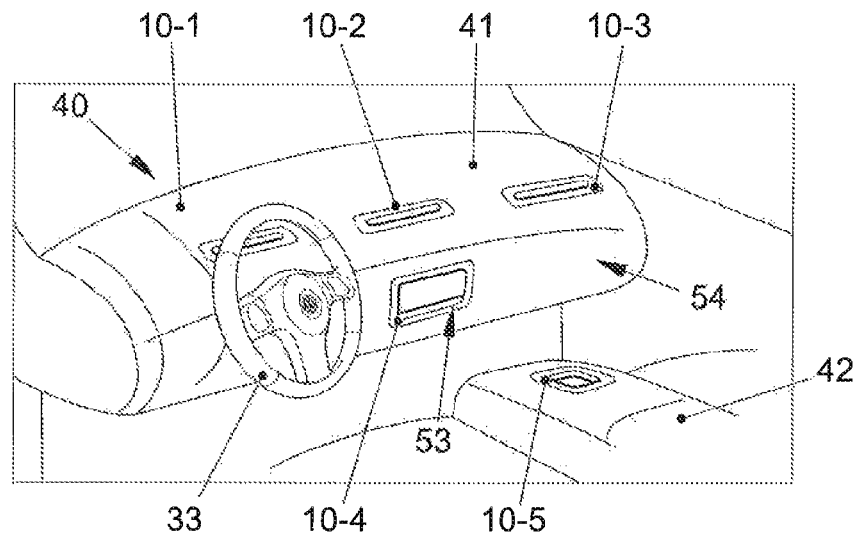
FIG. 3 shows a schematic interior view of a vehicle.

A schematic drawing of an interior 40 of a vehicle is shown in FIG. 3. In the shown embodiment, five holders 10-1 to 10-5 are formed in interior 40. Three holders 10-1 to 10-3 are provided on dashboard 41 and holder 10-4 in dashboard 41 and a holder 10-5 in a center armrest 42.

Figure 4:
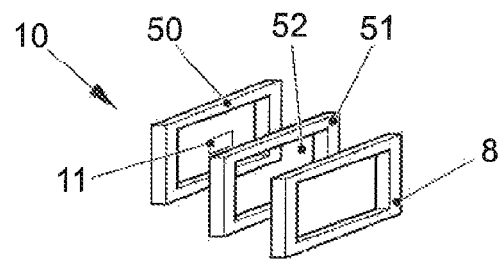
FIG. 4 shows a schematic exploded drawing of a holder.

An exploded drawing of a possible holder 10, for example holder 10-4 according to FIG. 3, is shown schematically in FIG. 4. An identification module 11, which, for example, is designed for near field communication (NFC), is arranged on a base plate 50. Further a layer 51 which is made of an elastic material and has a central through-opening 52, adapted to a contour of a mobile device 8 designed as a cellular telephone, is applied to base plate 50. Mobile device 8 therefore can be inserted in through-opening 52 of elastic layer 51, so that it sits flush with a surrounding contour, for example, a dashboard 41. In this case, holder 10 is arranged in the vehicle preferably so that its front edge 53 sits flush with a front section 54 of the dashboard (cf. FIG. 3).

Figure 5:
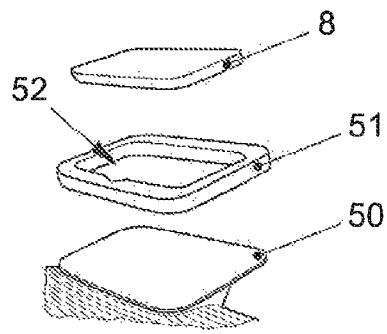
FIG. 5 shows a schematic illustration of a further holder.

A further embodiment of a holder 10 is illustrated schematically in FIG. 5. It again comprises a base plate 50 and an elastic layer 51 with a through-opening 52 for receiving a mobile device 8. The identification module in this embodiment is integrated into base plate 50 or placed behind said base plate.

It goes without saying for the person skilled in the art that only exemplary embodiments are described. The following functionalities, for example, are provided by the program code of the computer program product on the mobile device, provided it is a cellular telephone: the program control to set up the user interface, as explained above, the functionality of a radio, the functionality of a media player, the functionality of an Internet radio, the functionality of a telephone, the functionality of contact management, video-based augmented reality functions, such as, for example, navigation arrows in a video image, visualization of the brake distance of the vehicle, display of additional information on objects in the video image, for example, the speed, a description, etc., the illustration of virtual objects with GPS coordinates in a video image, etc., an overview of available functions and functionalities and optionally other functions from the field of infotainment and vehicle control, for example, of climate control functions, seat or window functions, etc.

Different functions are provided depending on the holder in which the mobile device is placed. In the case of placement of the mobile device in a holder behind the steering wheel, for example, trip-oriented functions are prioritized. In the case of placement in a holder in the center console, for example, infotainment functions are prioritized and in the case of placement in a holder before the passenger entertainment-oriented functions and functionalities are prioritized. This can occur, for example, in that certain elements, assigned to certain functionalities, of the user interface are opened automatically or displayed. This depends on the holder in which the mobile device is placed. In the case of the holder located behind the steering wheel, for example, an augmented reality function is automatically activated. Further, for example, functionalities associated with a video playback of recorded video material are prevented. The type of display of functions and functionalities is also managed differently depending on the employed holder or the arrangement in a specific installation location. In the case of an arrangement behind the steering wheel, infotainment information is reduced to a status display. Trip-related information, e.g., speed or augmented reality information, in contrast, is maximized. Overlays of keys if there is a touchscreen for touchscreen operation are maximized, provided the mobile device is placed in a center console, so that it often replaces or supplements display or operating devices arranged there.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle with an accessibility system comprising:
   a vehicle control device connected to different vehicle systems and vehicle functions;
   at least one vehicle communication device exchanging data via wireless communication with a mobile device; and
   at least two identification tags arranged in the vehicle each of the at least two identification tags containing an identification code readable by the mobile device, each of the at least two identification tags being positioned outside of the mobile device, a particular identification code designating a particular installation location of one of the at least two identification tags in the vehicle,
   wherein the vehicle control device initiates a communication connection to a mobile device via the vehicle communication device to receive the particular identification code read and transmitted by the mobile device, and, wherein the vehicle control device selectively allows and restricts access to individual vehicle functions or systems depending on the particular installation location designated by the received particular identification code.

2. The vehicle according to claim 1, wherein the vehicle control device comprises an authorization device that, depending on the transmitted identification code, controls an authorization for actuating or operating the vehicle functions or vehicle systems and an authorization for a two-way transmission of data between the vehicle systems or vehicle functions and the mobile device.

3. The vehicle according to claim 1, wherein, at the installation locations, holders are arranged or formed for receiving the mobile device, wherein one of the at least two identification tags is arranged on or in at least one of the holders.

4. The vehicle according to claim 3, wherein each holder comprises one or more elastic elements in or between which the mobile device is accommodated.

5. The vehicle according to claim 1, wherein each identification tag comprises at least one RFID chip.

6. The vehicle of claim 1, wherein the mobile device is installed in one of a plurality of holders mounted within the vehicle.

7. The vehicle of claim 1, the mobile device further comprising a display screen, wherein the display screen displays content based on an installation position of the mobile device.

8. The vehicle of claim 1, wherein the at least two identification tags are passive RFID modules.

9. The vehicle of claim 1, wherein the at least two identification tags utilize asymmetric encryption methods.

10. The vehicle of claim 1, wherein the vehicle control device also receives an application code assigned to a specific application or portion of an application.

11. The vehicle of claim 1, wherein the mobile device reads the particular identification code from one of the at least two identification tags and transmits the particular identification code to the vehicle control device.

12. The vehicle of claim 11, wherein the particular identification code read by the mobile device is from a nearest identification tag.

13. The vehicle of claim 11, wherein mobile device reads the particular identification code from one of the at least two identification tags wirelessly.

14. An accessibility system for a vehicle comprising:
   a vehicle control device connected to different vehicle systems and vehicle functions;
   at least one wireless vehicle communication device exchanging data with a mobile device;
   at least two identification tags, outside of the mobile device, being arranged in the vehicle, each of the at least two identification tags containing a readable identification code designating a particular vehicle installation location in the vehicle; and
   a computer program product having a program code executable in a program-controlled processing unit of a mobile device, the mobile device comprising an identification tag reader for receiving the identification codes from the at least two identification tags, at least one input device for acquiring user input, at least one output device, and a mobile device communication unit, each of which are controllable via the program-controlled processing unit,
   wherein the program code controls the identification tag reader in order to acquire with it the identification code of one of the at least two identification tags in an acquisition range of the identification tag reader outside of the mobile device to determine a location of the mobile device in the vehicle,
   wherein, if the identification code is acquired, a wireless communication connection is set up for exchanging data with the vehicle control device via the mobile device communication unit and the vehicle communication device, and
   wherein, depending on the location of the mobile device and the data exchanged via the communication connection, different functionalities of the vehicle systems or vehicle functions are provided and restricted for the at least one output device or the at least one input device.

15. The accessibility system of the vehicle according to claim 14, wherein the vehicle communication device and mobile device communication unit are designed for wireless communication, a Bluetooth interface, or WLAN interfaces.

16. The accessibility system of the vehicle according to claim 14, wherein at least one holder is designed such that the mobile device placed in the holder acquires an environment of the vehicle via a digital camera, wherein the mobile device comprises the digital camera with a detection aperture on an opposite side from a display area of a display device, and wherein the program code is designed to bring about an acquisition of the environment of the vehicle via the digital camera and displays on the display area an augmented reality of the environment of the vehicle with the aid of data transmitted via the communication connection of the vehicle control device.

17. The accessibility system of the vehicle according to claim 14, wherein the identification tag reader receives, continuously or at intervals, the identification code of one of the at least two identification tags located in the acquisition range, and wherein access to functionalities of the vehicle systems or vehicle functions is ended as soon as the receiving fails or a change in the identification code is detected.

18. The accessibility system of the vehicle according to claim 14, wherein a first acquired identification code allows access to more vehicle functions or vehicle systems than a second acquired identification code.

19. A vehicle comprising:
   at least two RFID tags arranged at different locations within the vehicle;
   a first vehicle system and a second vehicle system connectable to one another via a vehicle bus, each of the first and second vehicle systems controlling different vehicle functions;
   a mobile device being connectable to at least one of the first vehicle system or second vehicle system and being arranged in a different location within the vehicle than the at least two RFID tags, the mobile device having a display screen and an identification reader for reading an identification code that is wirelessly provided from at least one of the at least two RFID tags, the identification code designating a particular installation location of the at least one of the at least two RFID tags, each of the at least two RFID tags having a different identification code from one another, the mobile device determining a location of the mobile device within the vehicle based on the received identification code from at least one of the at least two RFID tags,
   wherein the mobile device allows and restricts access to the vehicle functions based on the location of the mobile device within the vehicle.

20. The vehicle according to claim 19, wherein the vehicle functions comprise a control of:
   a vehicle audio system;
   a ventilation system;
   a lane keeping assist system;
   a parking assistance system;
   actuators;
   sensors; or content provided to the display screen of the mobile device.

21. A computer program product for a vehicle-related accessibility system, the computer program product comprising:
   program code executable in a program-controlled processing unit of a mobile device, the mobile device comprising an identification tag reader receiving identification codes from identification tags arranged in a vehicle, at least one input device for acquiring user input, at least one output device, and a mobile device communication unit, each of which are controllable via the program-controlled processing unit,
   wherein the identification tag reader scans for an identification code of one of the identification tags in an acquisition range of the identification tag reader outside of the mobile device, the identification code identifying a mounting location in the vehicle, and
   if the identification code is acquired, the mobile device establishes a wireless communication connection exchanging data between a vehicle control device via the mobile device communication unit and a vehicle communication device and,
   depending on the acquired identification code and the exchanged data, the mobile device provides and restricts different functionalities of the vehicle systems available to the at least one output device or the at least one input device of the mobile device.

* * * * *